United States Patent
Takahashi

(10) Patent No.: US 10,210,671 B2
(45) Date of Patent: Feb. 19, 2019

(54) EDITING APPARATUS OF THREE-DIMENSIONAL SHAPE DATA, RECORDING MEDIUM STORING EDITING PROGRAM OF THREE-DIMENSIONAL SHAPE DATA, AND RECORDING MEDIUM STORING DATA STRUCTURE OF THREE-DIMENSIONAL SHAPE DATA

(71) Applicant: FUJI XEROX CO., LTD., Tokyo (JP)

(72) Inventor: Tomonari Takahashi, Ebina (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/593,708

(22) Filed: May 12, 2017

(65) Prior Publication Data

US 2018/0108184 A1 Apr. 19, 2018

(30) Foreign Application Priority Data

Oct. 19, 2016 (JP) .................................. 2016-204990

(51) Int. Cl.
*G06T 19/20* (2011.01)

(52) U.S. Cl.
CPC ...... *G06T 19/20* (2013.01); *G06T 2219/2004* (2013.01); *G06T 2219/2012* (2013.01); *G06T 2219/2016* (2013.01); *G06T 2219/2021* (2013.01)

(58) Field of Classification Search
CPC ............. G06T 19/20; G06T 2219/2004; G06T 2219/2021; G06T 2219/2016; G06T 2219/2012
See application file for complete search history.

(56) References Cited

U.S. PATENT DOCUMENTS

| 6,069,634 A | 5/2000 | Gibson |
| 6,982,711 B1 | 1/2006 | Takagi |
| 2003/0058259 A1* | 3/2003 | Kawaguchi ......... G06F 17/5018 345/646 |
| 2004/0174358 A1 | 9/2004 | Takagi |
| 2004/0174359 A1 | 9/2004 | Takagi |
| 2012/0281013 A1* | 11/2012 | Mahdavi ................. G06F 17/50 345/619 |

(Continued)

FOREIGN PATENT DOCUMENTS

| JP | H07-168873 A | 7/1995 |
| JP | H09-153079 A | 6/1997 |

(Continued)

OTHER PUBLICATIONS

Aug. 15, 2017 Office Action issued in Japanese Patent Application No. 2016-204990.

(Continued)

*Primary Examiner* — Maurice L. McDowell, Jr.
(74) *Attorney, Agent, or Firm* — Oliff PLC

(57) ABSTRACT

An editing apparatus of three-dimensional shape data, includes: a range setting unit that sets at least one of a protection target range and an editable range of a three-dimensional shape represented by three-dimensional shape data including three-dimensional position information, as an edit control range; and a control condition setting unit that sets a control condition for controlling edit in the editable range so as not to edit the protection target range when the editable range is edited.

15 Claims, 12 Drawing Sheets

(56) References Cited

U.S. PATENT DOCUMENTS

2014/0324204 A1 10/2014 Vidimce et al.
2015/0258770 A1 9/2015 Chan et al.

FOREIGN PATENT DOCUMENTS

| JP | H10-208078 A | 8/1998 |
|---|---|---|
| JP | 2001-184383 A | 7/2001 |
| JP | 2001-351115 A | 12/2001 |
| JP | 3512406 B2 | 3/2004 |
| JP | 2013-510358 A | 3/2013 |

OTHER PUBLICATIONS

Aug. 8, 2017 International Search Report issued in International Patent Application No. PCT/JP2017/018104.
Aug. 8, 2017 Written Opinion issued in International Patent Application No. PCT/JP2017/018104.
Mar. 14, 2017 Office Action issued in Japanese Patent Application No. 2016-204990.

\* cited by examiner

FIG. 4

| VOXEL ID | PROTECTION ATTRIBUTE | CONTROL CONDITION |
|---|---|---|
| 1 | PROTECTION | S1 |
| 2, 3, 4, 8, 9, 10, 21, 22, 23, 36, 37, 38, 51, 52 | PROTECTION | S2, S3, S4, S5 |
| 30-80 | PROTECTION | S3, S6 |
| ... | | |
| 51, 104 | EDIT | S51 |
| 52-68, 77-91, 105-300 | EDIT | S52, S60, S77 |
| ... | | |

EDITING APPARATUS OF THREE-DIMENSIONAL SHAPE DATA, RECORDING MEDIUM STORING EDITING PROGRAM OF THREE-DIMENSIONAL SHAPE DATA, AND RECORDING MEDIUM STORING DATA STRUCTURE OF THREE-DIMENSIONAL SHAPE DATA

CROSS-REFERENCE TO RELATED APPLICATIONS

This application is based on and claims priority under USC 119 from Japanese Patent Application No. 2016-204990, filed on Oct. 19, 2016.

TECHNICAL FIELD

The present invention relates to an editing apparatus of three-dimensional shape data, a recording medium storing an editing program of the three-dimensional shape data, and a recording medium storing a data structure of the three-dimensional shape data.

SUMMARY

According to an aspect of the invention, there is provided an editing apparatus of three-dimensional shape data, including: a range setting unit that sets at least one of a protection target range and an editable range of a three-dimensional shape represented by three-dimensional shape data including three-dimensional position information, as an edit control range; and a control condition setting unit that sets a control condition for controlling edit in the editable range so as not to edit the protection target range when the editable range is edited.

BRIEF DESCRIPTION OF THE DRAWINGS

Exemplary embodiment(s) of the present invention will be described in detail based on the following figures, wherein:

FIG. 4 is a diagram showing a data structure of the three-dimensional shape data;

DETAILED DESCRIPTION

Hereinafter, with reference to the drawings, embodiment examples for implementing an exemplary embodiment of the invention will be described in detail.

Figure 1:
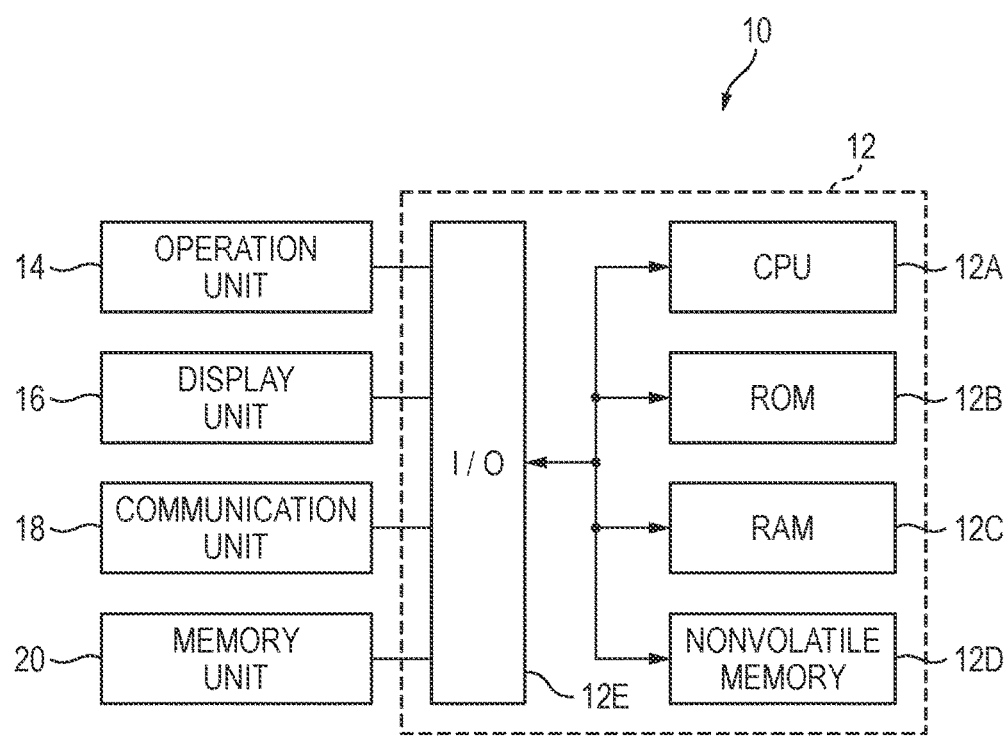
FIG. 1 is a block diagram of an editing apparatus of three-dimensional shape data.

First, with reference to FIG. 1, an editing apparatus 10 of three-dimensional shape data according to the exemplary embodiment will be described.

For example, the editing apparatus 10 is configured with a personal computer or the like, and includes a controller 12. The controller 12 includes a central processing unit (CPU) 12A, a read only memory (ROM) 12B, a random access memory (RAM) 12C, a nonvolatile memory 12D, and an input and output interface (I/O) 12E. The CPU 12A, the ROM 12B, the RAM 12C, the nonvolatile memory 12D, and the I/O 12E are connected to each other through a bus 12F.

An operation unit 14, a display unit 16, a communication unit 18, and a memory unit 20 are connected to the I/O 12E. The CPU 12A is an example of a range setting unit, a control condition setting unit, and an editing unit.

For example, the operation unit 14 includes a mouse and a keyboard.

For example, the display unit 16 includes a liquid crystal display or the like.

The communication unit 18 is an interface for performing data communication with an external device.

The memory unit 20 is configured by a nonvolatile memory device such as a hard disk, and stores an editing program of three-dimensional shape data or the like which will be described below. The CPU 12A executes the editing program by reading the editing program of the three-dimensional shape data stored in the memory unit 20.

Figure 2:
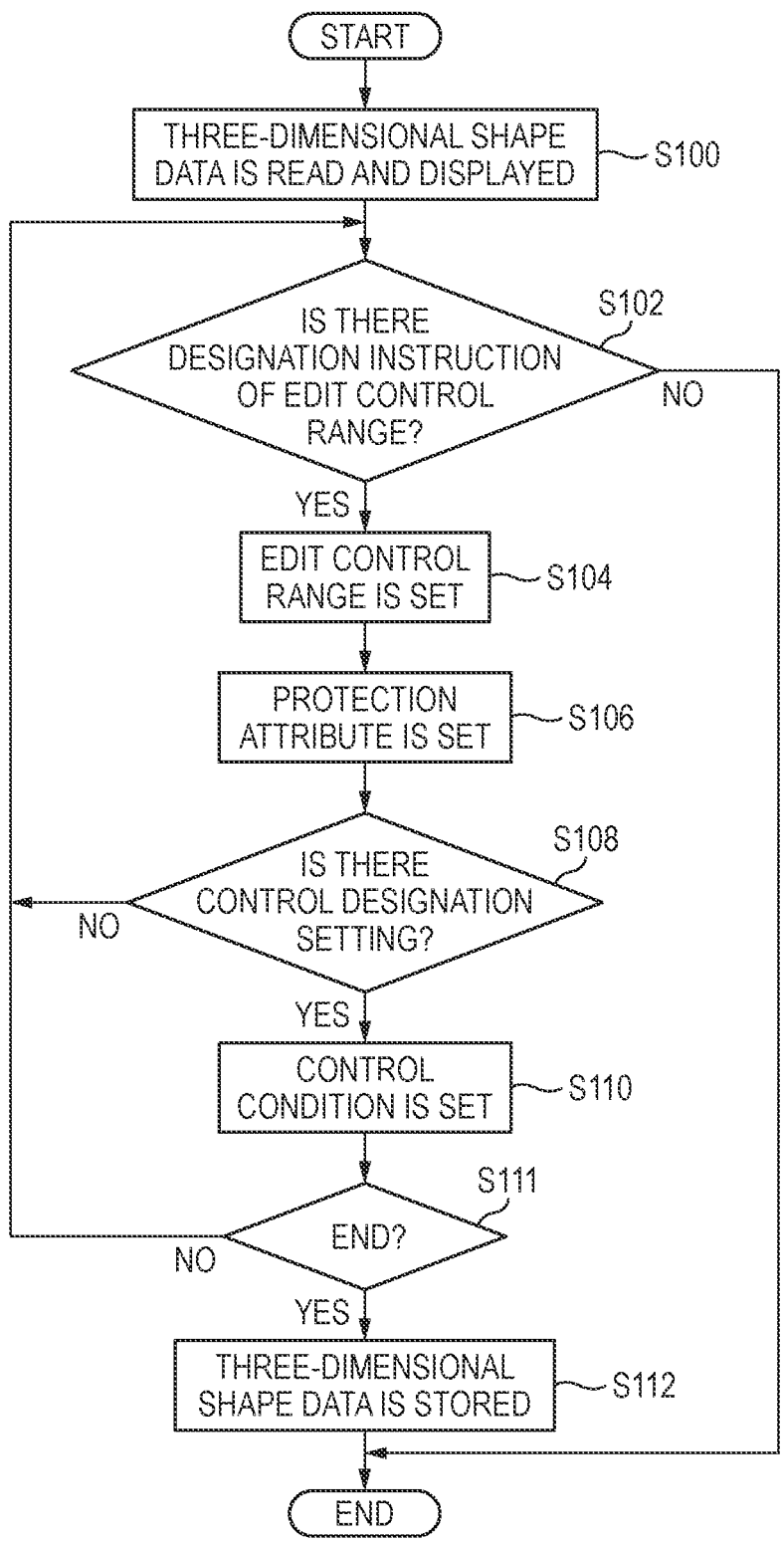
FIG. 2 is a flowchart of an editing program for setting an edit control range of a three-dimensional shape represented by the three-dimensional shape data.

Next, with reference to FIGS. 2 and 3, an operation of the editing apparatus 10 according to the exemplary embodiment will be described. By executing the editing program by the CPU 12A, an editing process shown in FIG. 2 is performed. For example, the editing process shown in FIG. 2 is performed in a case where execution of the editing program is instructed by a user. Here, the process shown in FIG. 2 is a process for setting an edit control range of a three-dimensional shape represented by the three-dimensional shape data. The edit control range represents at least one of a protection target range within which edit of the three-dimensional shape is disabled and an editable range within which the edit of the three-dimensional shape is enabled. For example, the process of FIG. 2 is performed in a case where the edit control range is set with respect to three-dimensional shape data modeled by an engineer or the like.

In an exemplary embodiment, the "edit" includes that a shape of at least a part of the three-dimensional shape is changed by performing a process such as transformation, enlargement, reduction, movement, rotation, addition, deletion, replacement, and synthesis with respect to at least a part of the three-dimensional shape.

In addition, the "edit" includes that an attribute of at least a part of the three-dimensional shape is changed by performing a process such as addition, deletion, change, replacement, and synthesis with respect to at least a part of at least one piece of attribute information of color, intensity, material, and texture given to three-dimensional position information.

Here, the "material" includes at least one piece of information among information representing category of materials such as resin, metal, and rubber, information representing material names such as ABS and PLA, information representing a product name, a product number, or the like of a commercially available material, information representing materials such as a material name, an abbreviation, and a number defined by standards such as ISO and JIS, and information representing material properties such as thermal conductivity, conductivity, and magnetism.

In addition, the "texture" represents attribute information representing not only color such as reflectance, transmittance, gloss, and surface characteristics of the three-dimensional shape data but also appearance and touch feeling.

The attribute information includes an attribute pattern set by using at least one piece of information of a period, a formula, and other three-dimensional shape data given to the three-dimensional position information. The attribute pattern includes at least one of continuous change of color, material, texture, and the like of three-dimensional shape data according to repetition during a certain period, gradation, expression by inclination or an extreme point expressed by a mathematical formula, other three-dimensional shape data, or the like, and filling or continuous change of an instructed range of the three-dimensional shape data with an instructed shape.

In step S100 of FIG. 2, the CPU 12A reads the three-dimensional shape data in which the three-dimensional shape is modeled from the memory unit 20, and the three-dimensional shape based on the read three-dimensional shape data is displayed on the display unit 16. The three-dimensional shape data is generated by creating at least the three-dimensional shape and designating attributes such as color and material, according to an operation on the operation unit 14 by a user.

In the exemplary embodiment, a case where a data format which expresses the three-dimensional shape by a set of voxels is used as a data format of the three-dimensional shape data is described, but other data formats may be used.

Here, although the voxel is a basic element of the three-dimensional shape and used as, for example, a cube, the voxel is not limited to the cube. The voxel may be used as a sphere, a cylinder, or the like. By arranging the voxels in three dimensions, a desired three-dimensional shape is expressed. In addition, by designating attributes such as color and material for each voxel, display of the three-dimensional shape data and colors and materials after molding are expressed.

The three-dimensional shape data according to the exemplary embodiment includes voxel information relating to plural voxels configuring at least the three-dimensional shape, a protection attribute representing the protection target range and the editable range of the three-dimensional shape, and a control condition for controlling the edit of the three-dimensional shape.

Specifically, as a data structure 30 shown in FIG. 4, it is a table data structure representing a correspondence relationship between a voxel ID, the protection attribute, and the control condition. The data structure is not limited to the table data, but may be other structures such as a hierarchical structure as long as it is the data structure representing the correspondence relationship.

The voxel ID is a unique ID given to each voxel. The voxel ID may be represented by the coordinate values of X, Y, and Z in the three-dimensional space, may be represented by index numbers of X, Y, and Z when the three-dimensional space is evenly divided by a grid, and may be represented by a serial number from the origin.

The protection attribute is information representing whether to protect the three-dimensional shape or to permit edit, and information of "protection" that the edit of the three-dimensional shape is disabled, or "editable" that the edit of the three-dimensional shape is set for each voxel or each range set by the voxel.

In addition, the attribute of color, material, or the like of the voxel may be set in the data structure 30. In this case, for example, the color of the voxel is represented by red (R), green (G), blue (B), and alpha (A: transparency). In addition, the attribute may hold information equivalent to the information such as the color, the intensity, the material, and the texture given to the three-dimensional shape data described above, as the data structure 30 instead of each voxel.

The control condition is a condition for controlling the edit of the three-dimensional shape, and details thereof will be described below.

Figure 5:
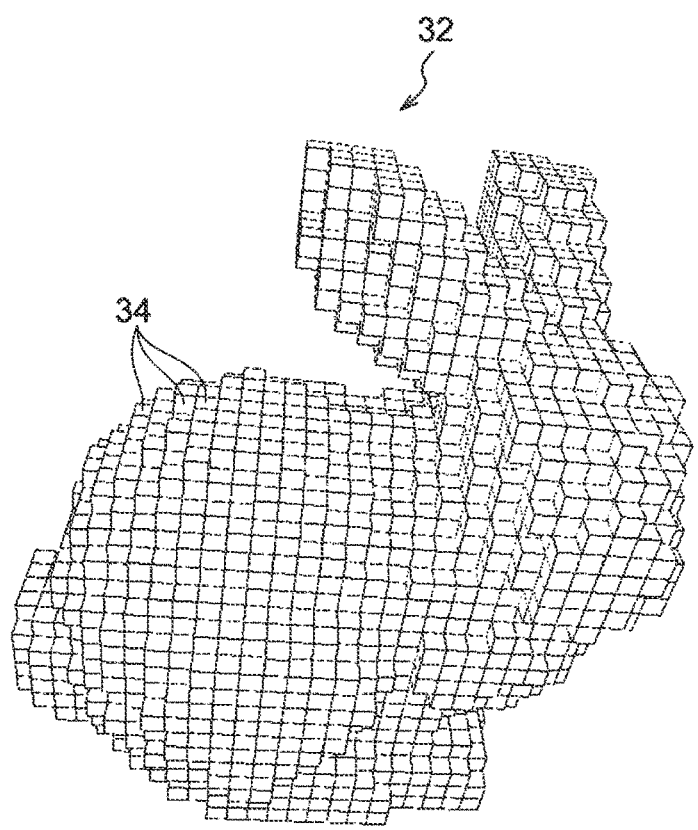
FIG. 5 is a diagram showing an example of the three-dimensional shape.
Figure 6:
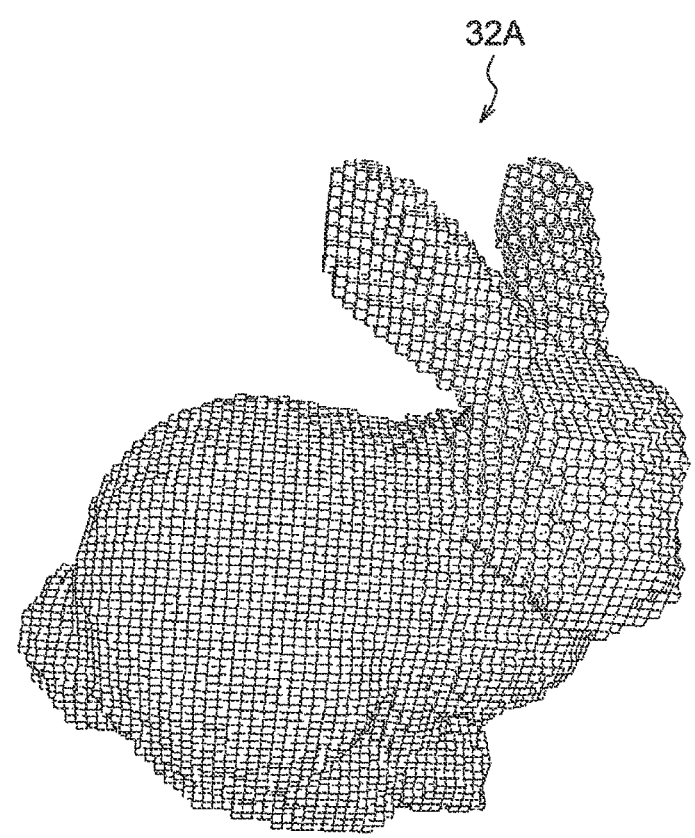
FIG. 6 is a diagram showing an example of the three-dimensional shape.
Figure 7:
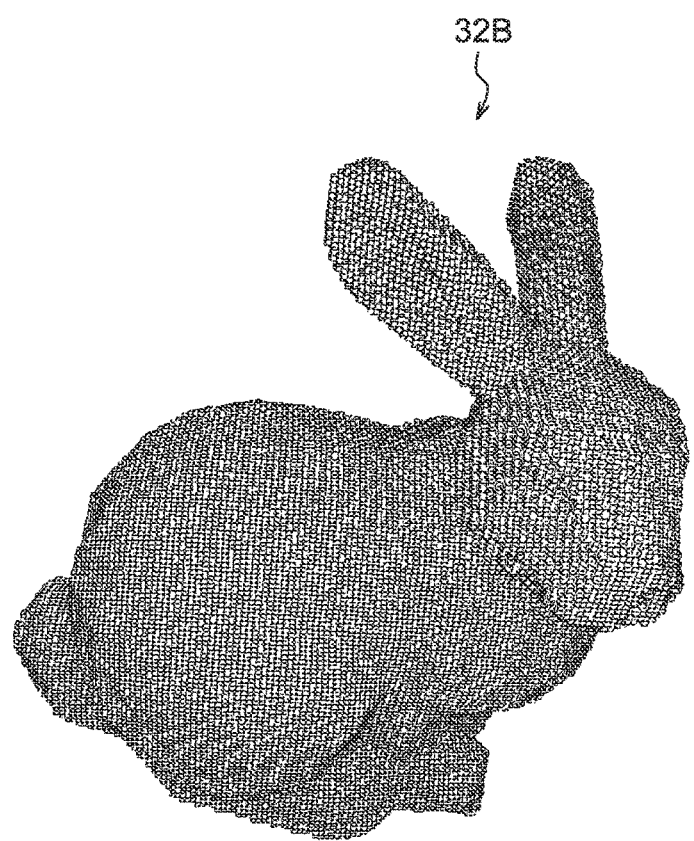
FIG. 7 is a diagram showing an example of the three-dimensional shape.

FIG. 5 shows an example of the three-dimensional shape represented by a set of voxels. As shown in FIG. 5, a three-dimensional shape 32 represents a rabbit with a set of plural voxels 34. By decreasing a size of the voxel 34, three-dimensional shapes 32A and 32B are represented in more detail as shown in FIGS. 6 and 7.

In step S102, is the CPU 12A determines whether or not setting of the edit control range is designated according to an operation by a user. The process transitions to step S104 in a case where it is positively determined, and the process is ended in a case where it is negatively determined.

In step S104, the CPU 12A sets the edit control range.

Figure 8:
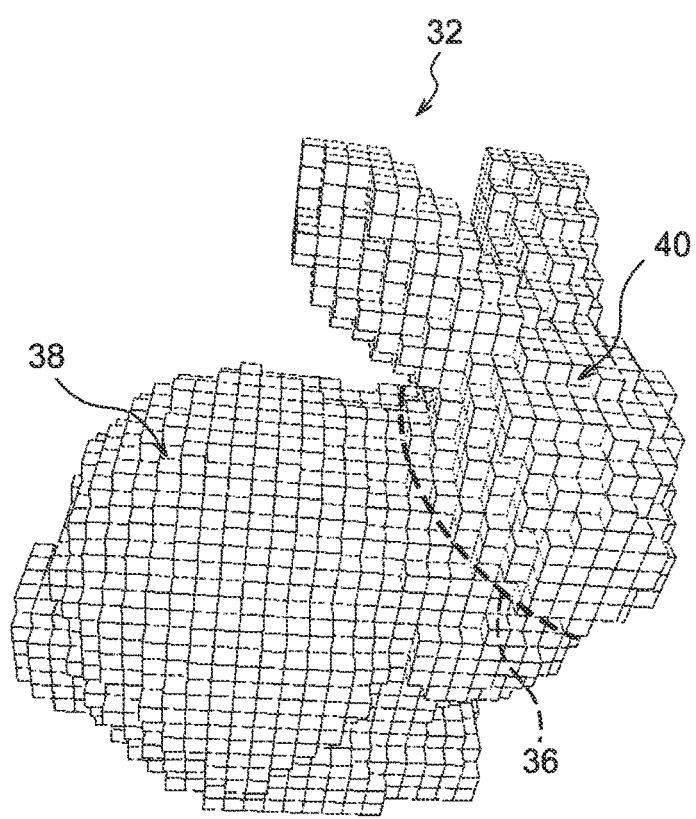
FIG. 8 is a diagram for explaining a protection target range and the editable range.

Hereinafter, a specific example of setting of the edit control range will be described. For example, a user designates the protection target range among the three-dimensional shapes, that is, a range within which the edit is disabled or the editable range within which the edit is enabled. As shown in FIG. 8, for example, with respect to the three-dimensional shape 32 of the rabbit, a user can set a boundary line 36 at a boundary between the body and the head of the rabbit, the body of the rabbit can be set as a protection target range 38, and the head can be set as an editable range 40. For example, the boundary line 36 is set by designating voxels equal to or greater than two. In addition, the boundary line 36 may be either a line segment, a half straight line, or a straight line represented by two voxels, or may be a curve represented by voxels equal to or greater than three.

The edit control range may be newly defined with respect to the three-dimensional shape data, and the three-dimensional position information originally included in the three-dimensional shape data and the attribute information given to the three-dimensional position information may be used as the edit control range. For example, in a case where the head and the body are defined as different parts, the edit control range may be set so that only the head part can be edited.

Figure 9:
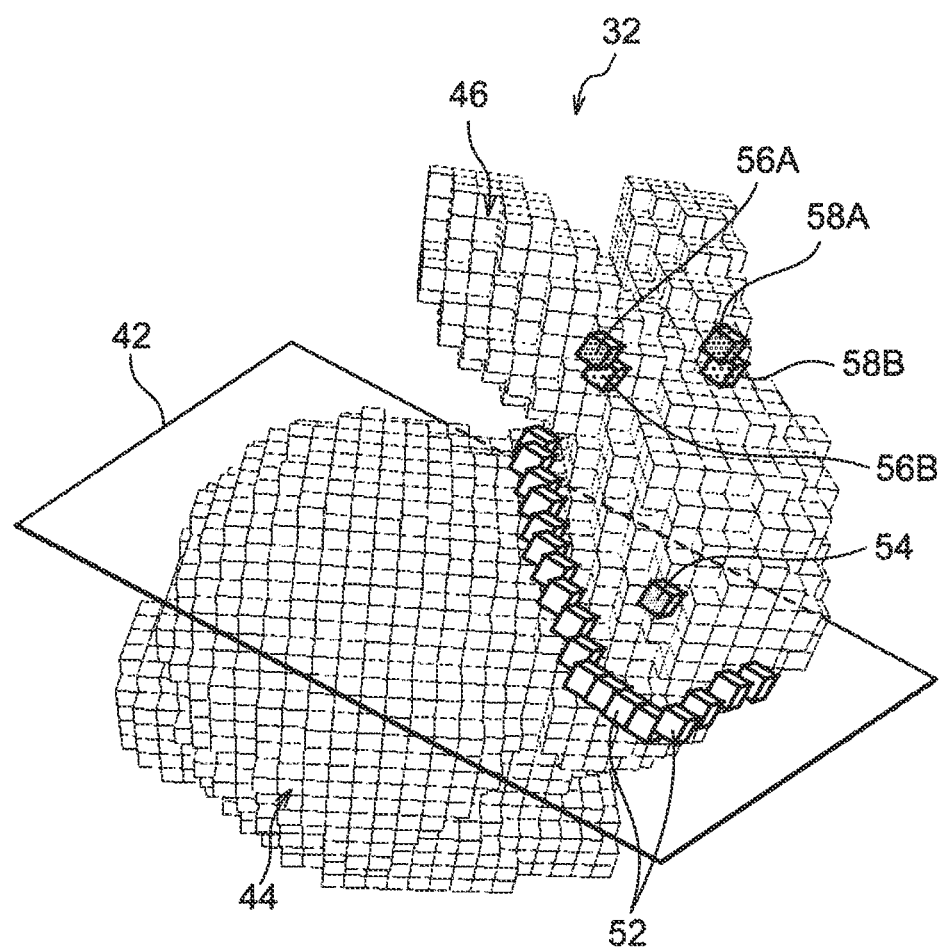
FIG. 9 is a diagram for explaining a control condition.

In addition, as shown in FIG. 9, a boundary plane 42 is set at a boundary between the protection target range and the editable range, and, for example, a lower range may be set as a protection target range 44 by the boundary plane 42, and a higher range may be set an editable range 46 by the boundary plane 42. For example, the boundary plane 42 is set by designating three voxels. In addition, although the boundary plane 42 is a plane, the curved boundary plane may be set by designating the plural voxels.

Figure 10:
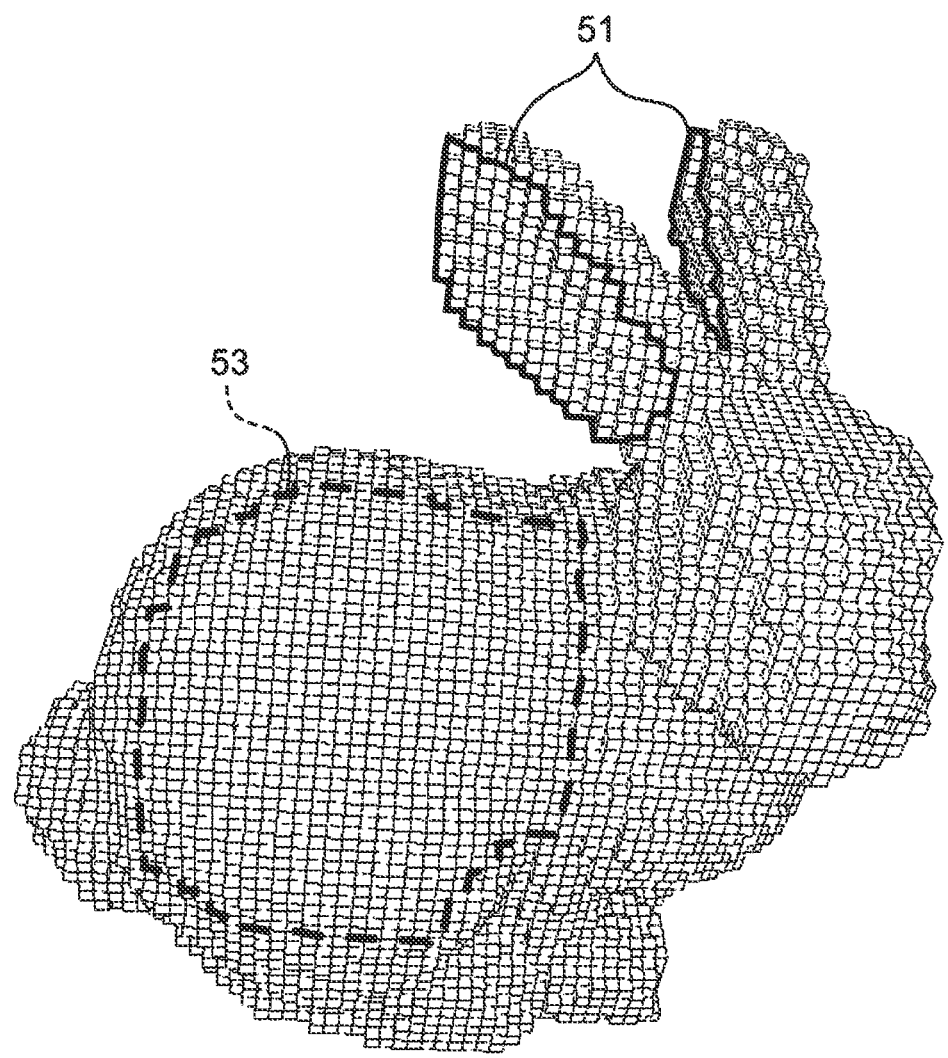
FIG. 10 is a diagram for explaining a control condition.

In addition, for example, as shown in FIG. 10, in the three-dimensional shape 32 of the rabbit, in a case where the intensity attribute of soft is given to the three-dimensional position information representing a range 51 inside the ears of the rabbit, the edit control range may be set so that only a range of the three-dimensional shape data to which the same intensity attribute is given becomes the editable range. In addition, in a case where the attribute pattern to which a lattice structure with a repetition period is filled is given to the three-dimensional position information representing a range 53 inside the body of the rabbit, a user may set the edit control range so that only a range of the three-dimensional shape data to which the same attribute pattern is given becomes the editable range, or the protection target range.

Similarly, in a case where color information is given to the three-dimensional position information, or in a case where texture mapping is performed, a user may set only a range of the three-dimensional shape data to which an arbitrary color is given as the edit control range. In this case, a user may designate a specific one color or a constant color range.

Similarly, in a case where material information is given to the three-dimensional position information, a user may set only the range of the three-dimensional shape data to which an arbitrary material is given as the edit control range. In this case, a user may designate a specific material such as ABS and PLA, a category of a material such as resin, metal, and rubber containing material, or a range of material properties such as a certain level of conductivity and a specific range of thermal conductivity.

Figure 11:
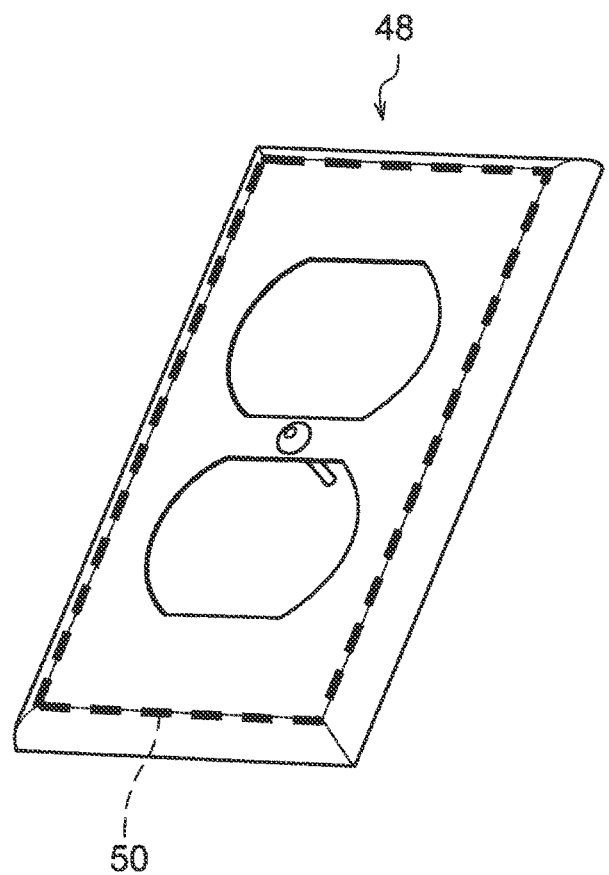
FIG. 11 is a diagram for explaining the protection target range.

In addition, as shown in FIG. 11, in the case of a three-dimensional shape 48 of an outlet cover, a user may set a plane 50 represented by a broken line as the editable range.

As described above, a user may newly define the edit control range with respect to the three-dimensional shape data, and the three-dimensional position information originally included in the three-dimensional shape data and the attribute information given to the three-dimensional position information may be used as the edit control range. For example, as the plane 50, a user may set a range of three-dimensional shape data that can be determined as a continuous plane in which a similar curvature continues as the edit control range.

In addition, a user may set both the protection target range and the editable range, only the protection target range may be set, or other ranges thereof may be automatically set as the editable range. In addition, only the editable range may be set, or other ranges thereof may be automatically set as the protection target range.

In step S106, the CPU 12A sets the protection attribute on each voxel. That is, the CPU 12A sets the protection attribute as "protection" with respect to the voxel of the protection target range designated by a user, and the protection attribute is set as the "editable" with respect to the voxel of the editable range.

In step S108, the CPU 12A determines whether or not the control condition is designated by an operation of a user. The process transitions to step S110 in a case where it is positively determined, and the process transitions to step S102 in a case where it is negatively determined.

In step S110, the CPU 12A sets the control condition designated by the user to the three-dimensional shape data.

Hereinafter, a specific example of setting of the control condition will be described.

For example, as shown in FIG. 9, a user may set the neck of the rabbit in the protection target range such that a control condition that the protection target range is not reduced inside the control voxel 52 around the neck may be set on the control voxel 52. With this, the edit is restricted so that the neck of the rabbit becomes thinner.

In addition, as shown in FIG. 9, a user may set, on the control voxel 54, which is set at the center of the neck, a control condition that the vicinity of the center of the neck of the rabbit as the protection target range and that it rotates around the control voxel 54 as the center. At this time, a rotation axis and a rotation angle may be set. With this, unnatural edit is restrained such that the head of the rabbit rotates about a range other than the neck of the rabbit as the center.

In addition, for example, as shown in FIG. 9, the vicinity of the ears of the rabbit may be set as a protection target, and a maximum separation distance at which a pair of voxels can be separated from each other between the voxels of the pair may be set as the control condition, the pair being a control voxel 56A and a control voxel 56B, and being a control voxel 58A and a control voxel 58B. In addition, a minimum separation distance that the pair of voxels have to be separated from each other may be set as the control condition. In addition, a direction, an angle, or the like which can be separated from each other may be set as the control condition. With this, for example, it is restrained that a distance between left and right ears of the rabbit is greatly changed. In addition, the control condition may be set such that thickness around the voxel of the pair becomes thickness within a predetermined range. With this, for example, it is restrained that the ears of the rabbit are greatly changed such as being too thick or too thin.

Figure 12:
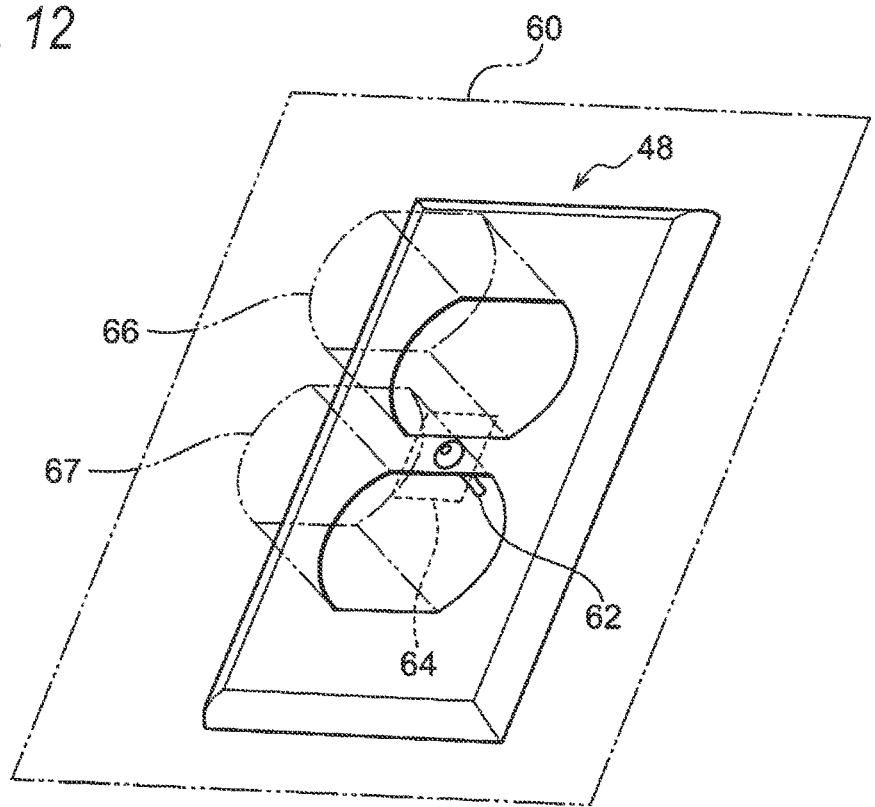
FIG. 12 is a diagram for explaining the control condition.

In addition, as shown in FIG. 12, in a case of the three-dimensional shape 48 of the outlet cover, for example, an attachment plane 60 of the outlet cover may be set and a control condition for prohibiting edit for existing the three-dimensional shape 48 behind the attachment plane 60 may be set. To set the attachment plane 60, for example, three voxels may be set in three points for defining a plane at infinity representing the attachment plane 60. This voxel does not represent the three-dimensional shape data, but may be set as a range setting voxel for representing edit control conditions.

In addition, in order to not permit edit of a range of a screw 62 for attaching the outlet cover to the wall, a region 64 including the screw 62 may be set as the protection target range.

In addition, since an electric plug is plugged into the outlet cover, space ranges 66 and 67 into which the electric plug is plugged is set as the protection target range, and a control condition prohibiting edit that the three-dimensional shape 48 in the space ranges 66 and 67 exists may be set. In addition, the space range may be set as the editable range, and a control condition permitting a change that the three-dimensional shape exists in the space range may be set.

To set the space ranges 66 and 67, for example, a user may set the voxel occupying the space range, or voxels to be feature points defining a space. Alternatively, other three-dimensional shape data defining the space ranges 66 and 67 may be used. For example, three-dimensional shape data representing a space range 66 may be prepared as data different from the three-dimensional shape 48, and may be used as the edit control range of the three-dimensional shape 48. In this case, plural three-dimensional shape data representing the space range 66 may be read and may be set as plural space ranges 66 and 67 of the same three-dimensional shape.

In addition, the space range may be not only simple shapes such as cubes, spheres, and cylinders but also a space range of complicated shapes representing irregular shapes or other component shapes. In addition, a continuous space may be the space range, or a noncontiguous space may be the space range. For example, plural different component shapes spaced apart from each other may be collectively one space range, or large and small interspersed spaces which are finely distributed may be one space range.

In addition, in a case of setting the space range with other three-dimensional shape data, only the space range inside the three-dimensional shape to be an edit target may be set as the edit control range, only the space range outside the three-dimensional shape to be the edit target may be set as the edit control range, a space range over the space ranges inside and outside the three-dimensional shape to be the edit target may be set as the edit control range.

In addition, in a case where the edit control range is set by other three-dimensional shape data, only the space range is not limited thereto. The three-dimensional position information of points, lines, and planes may be held as other three-dimensional shape data different from the three-dimensional shape data to be the edit target.

In addition, in a case where the edit control range is set by defining the three-dimensional shape data such as points, lines, planes, and spaces by using the voxel, the voxel to be used does not represent the three-dimensional shape data but may be as a range setting voxel for representing the edit control condition.

Figure 13:
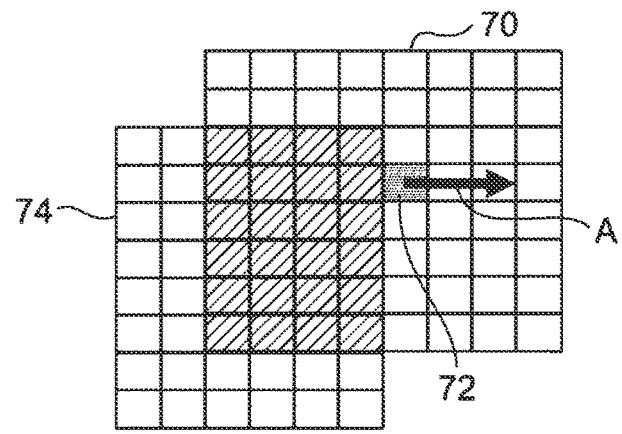
FIG. 13 is a diagram for explaining the control condition.

In addition, as shown in FIG. 13, in a case where a control voxel 72 is designated in a protection target range 70, a control condition for prohibiting movement, enlargement, reduction, or the like may be set on the control voxel 72 so as to exist an editable range 74 on a protection target range 70 side represented in the direction of an arrow A rather than the control voxel 72. In FIG. 13, although it is two-dimensionally described for convenience of illustration, actually it is three-dimensionally controlled. This is also applied to FIGS. 14 to 19.

Figure 14:
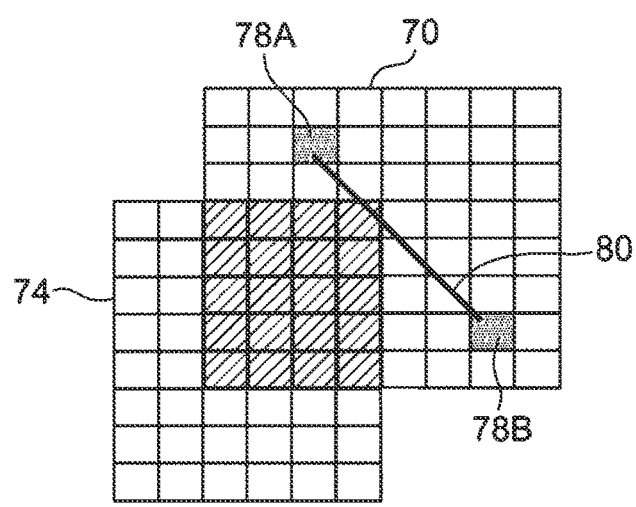
FIG. 14 is a diagram for explaining the control condition.

In addition, as shown in FIG. 14, in a case where two control voxels 78A and 78B are designated in the protection target range 70, the control condition for prohibiting movement, enlargement, reduction, or the like may be set on the control voxels 78A and 78B so as to exist the editable range 74 on a protection target range 70 side rather than a line segment 80, a half straight line 80, or a straight line 80 connecting two control voxels 78A and 78B. At this time, a control condition that permits movement of the editable range 74 on extended line of the line segment 80, the half straight line 80, or the straight line 80 may be set on the control voxels 78A and 78B.

Figure 15:
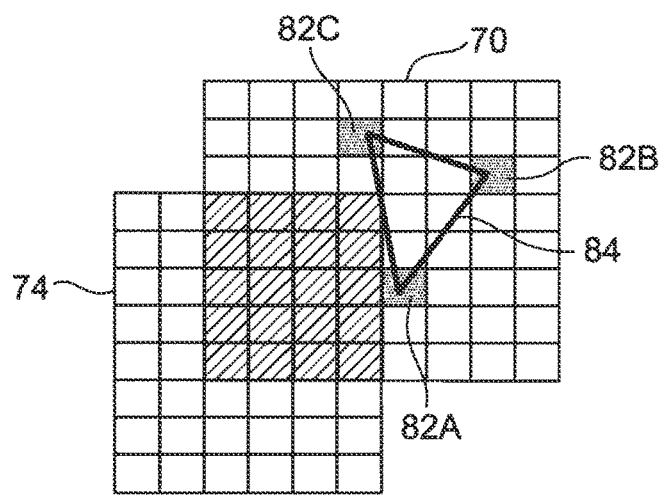
FIG. 15 is a diagram for explaining the control condition.

In addition, as shown in FIG. 15, in a case where three control voxels 82A, 82B, and 82C are designated in the protection target range 70, the control condition for prohibiting movement, enlargement, reduction, or the like may be set on the control voxels 82A, 82B, and 82C so as to exist the editable range 74 on a protection target range 70 side rather than a plane 84 configured by connecting the three control voxels 82A, 82B, and 82C. At this time, a control condition permitting movement of the editable range 74 on a plane 84 and a plane including the plane 84 may be set on the control voxels 82A, 82B, and 82C.

Figure 16:
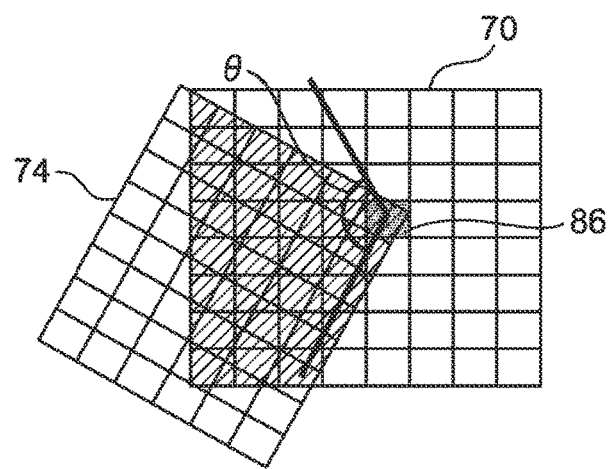
FIG. 16 is a diagram for explaining the control condition.

In addition, as shown in FIG. 16, in a case where a control voxel 86 and a rotation angle θ are designated in the protection target range 70, a control condition prohibiting rotation of the editable range 74 which exceeds the rotation angle θ around the control voxel 86 as the center may be set on the control voxel 86.

Figure 17:
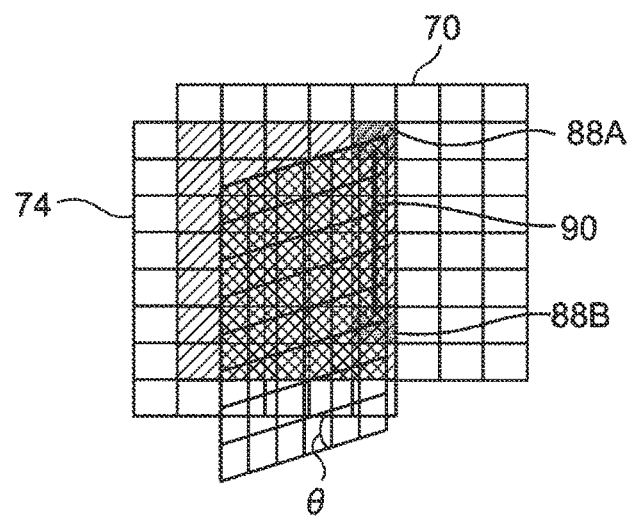
FIG. 17 is a diagram for explaining the control condition.

In addition, as shown in FIG. 17, in a case where two control voxels 88A and 88B, and the rotation angle θ are designated in the protection target range 70, a control condition prohibiting rotation of the editable range 74 which exceeds the rotation angle θ around a straight line 90 connecting the two control voxels 88A and 88B as an axis may be set on the control voxels 88A and 88B.

Figure 18:
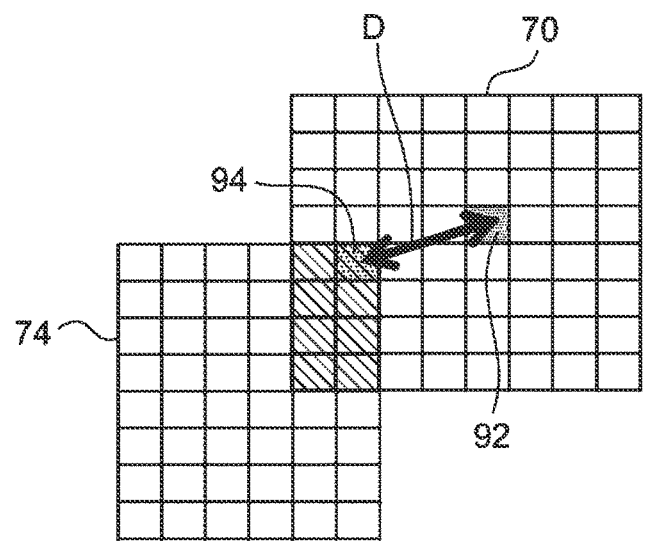
FIG. 18 is a diagram for explaining the control condition.

In addition, as shown in FIG. 18, a control condition prohibiting that a control voxel 92 is set in the protection target range 70, a control voxel 94 is set in the editable range 74, and a distance D between the control voxel 92 and the control voxel 94 exceeds a predetermined distance, may be set on control voxels 92 and 94. In addition, a control condition prohibiting that the distance D between the control voxel 92 and the control voxel 94 is within a predetermined distance, may be set on the control voxels 92 and 94.

Figure 19:
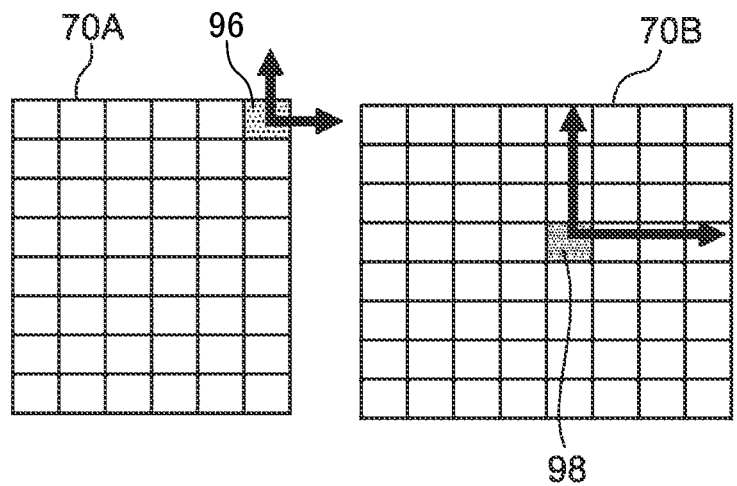
FIG. 19 is a diagram for explaining the control condition.

In addition, as shown in FIG. 19, a control condition that a control voxel 96 set in a protection target range 70A has to be set on the outermost of the protection target range 70A, may be set. In addition, a control condition that the voxels equal to or greater than n (three in example of FIG. 19) have to exist outside a control voxel 98 in the protection target range 70B, may be set.

A new restriction condition may be defined with respect to the edit control range set in the three-dimensional shape data, and a predetermined restriction condition may be applied thereto. For example, restriction conditions such as thickness, length, and diameter of components specified by standards such as ISO and JIS, restriction conditions such as thickness, length, and diameter of components specified by specifications, restrictions, or the like of manufacturing devices, restriction conditions frequently used by a user, or the like, may be set in the edit control range.

In addition, the edit control range and the restriction condition may be combined and managed. In this case, the edit control range and the restriction condition may be applied to the three-dimensional shape data to be the edit target at the same time, and only the edit control range or only the restriction condition may be applied thereto.

In addition, the edit control range and the restriction condition are combined so that the combined result may be held as other three-dimensional shape data different from the three-dimensional shape data of the edit target.

The control conditions described in FIGS. 13 to 19 may be combined. In addition, the three-dimensional shape may be set as a protection target, and only the attribute information given to the three-dimensional shape may be editable. Conversely, the three-dimensional shape may be editable, and the control conditions may be combined so as to set the attribute information given to the three-dimensional shape to be the protection target.

In step S111, is the CPU 12A determines whether or not "end" is selected according to an operation of a user. The process transitions to step S112 in a case where it is positively determined, and the process transitions to step S102 and the processes are repeated in a case where it is negatively determined.

In step S112, the CPU 12A stores the three-dimensional shape data after processing in the memory unit 20.

In the process of FIG. 2, a case where the edit control range is set by reading the three-dimensional shape data already created, is described, but the setting of the edit control range may be performed while creating the three-dimensional shape data.

Next, with reference to FIG. 3, the editing process by the editing program for editing the editable range of the three-dimensional shape will be described. By executing the editing program by the CPU 12A, the editing process shown in FIG. 3 is performed. For example, the editing process shown in FIG. 3 is performed in a case where execution of the editing program is instructed by an operation of a user. Here, the process shown in FIG. 3 is a process for editing the three-dimensional shape data in which the editable range of the three-dimensional shape is already set. For example, the process of FIG. 3 is performed in a case where the three-dimensional shape data in which the editable range of the three-dimensional shape is already set by another author is edited at his/her home by a user obtaining the three-dimensional shape data via, for example, the Internet, or the like.

In step S200, the CPU 12A reads the three-dimensional shape data designated by a user from the memory unit 20, and displays a three-dimensional shape objector on the display unit 16 based on the read three-dimensional shape data.

In step S202, the CPU 12A determines whether or not edit is instructed with respect to the three-dimensional shape displayed on the display unit 16 according to an operation of a user. The process transitions to step S204 in a case where it is positively determined, and the process transitions to step S210 in a case where it is negatively determined.

In step S204, the CPU 12A determines whether or not the range in which the edit is instructed in step S202 is in the editable range. The process transitions to step S206 in a case where it is determined that the range in which the edit is instructed in step S202 is in the editable range, and the process transitions to step S208 in a case where it is determined that the range is not in the editable range.

In step S206, the CPU 12A edits the three-dimensional shape based on the control condition of the read three-dimensional shape data.

Meanwhile, in step S208, since the edit of the three-dimensional shape data is protected, the CPU 12A displays a warning message warning that the edit of the three-dimensional shape data is restricted on the display unit 16.

For example, it is assumed that a control condition that the three-dimensional shape is the three-dimensional shape 32 of the rabbit shown in FIG. 8 described above, and the control voxel 52 is designated around the neck of the rabbit, and the three-dimensional shape does not shrink inside the designated control voxel 52, is set in the control voxel 52. In this case, the CPU 12A does not permit the edit, even if the user instructs edit in which the neck of the rabbit becomes thinner, for example, by displaying a warning message to stop the edit, invalidating the user's instruction, or the like. With this, the edit such as the neck of the rabbit becomes thinner is restricted, and the protection target range is protected.

In a case where an instruction for editing only the editable range without editing the protection target range is made, the instruction is permitted and the CPU 12A displays the three-dimensional shape edited according to the instruction on the display unit 16.

In a case where the range in which the edit is instructed is not in the editable range, the CPU 12A may invalidate an operation on the edit instruction made by a user.

In addition, in a case where the range in which the edit is instructed by a user includes both the protection target range and the editable range, the CPU 12A may permit the edit in only the editable range. For example, in a case where the edit operation by a user approaches the protection target range, the CPU 12A may reflect only the edit up to the protection target range, and stop the edit in the protection target range as a boundary. In addition, in a case where a user tries to combine other three-dimensional shape data with respect to the protection target range in which only the attribute information is editable and a control condition is set, the CPU 12A may combine only the attribute information given to the three-dimensional shape data to a target range without reflecting the three-dimensional shape.

Furthermore, the CPU 12A may permit to edit the protection target range in only a case where a specific condition is satisfied. For example, in a case where a specific condition that the user who performs setting of the edit control range is the same user, a user holds specific permission information such as a password and an encryption key specified by the user who performs setting of the edit control range, or the like, is satisfied, the CPU 12A may permit edit in a range to be the protection target by changing setting of the protection target range.

In step S210, the CPU 12A determines whether or not "end" is selected by an operation of a user. The process transitions to step S212 in a case where it is positively determined, and the process transitions to step S202 in a case where it is negatively determined such that the processes are repeated.

In step S212, the CPU 12A stores the three-dimensional shape data after processing in the memory unit 20.

As described above, in a case where the control condition for controlling edit in the editable range is set, since only the editable range is edited without editing the protection target range, the three-dimensional shape is edited in a range in which an original three-dimensional shape is not impaired.

Figure 3:
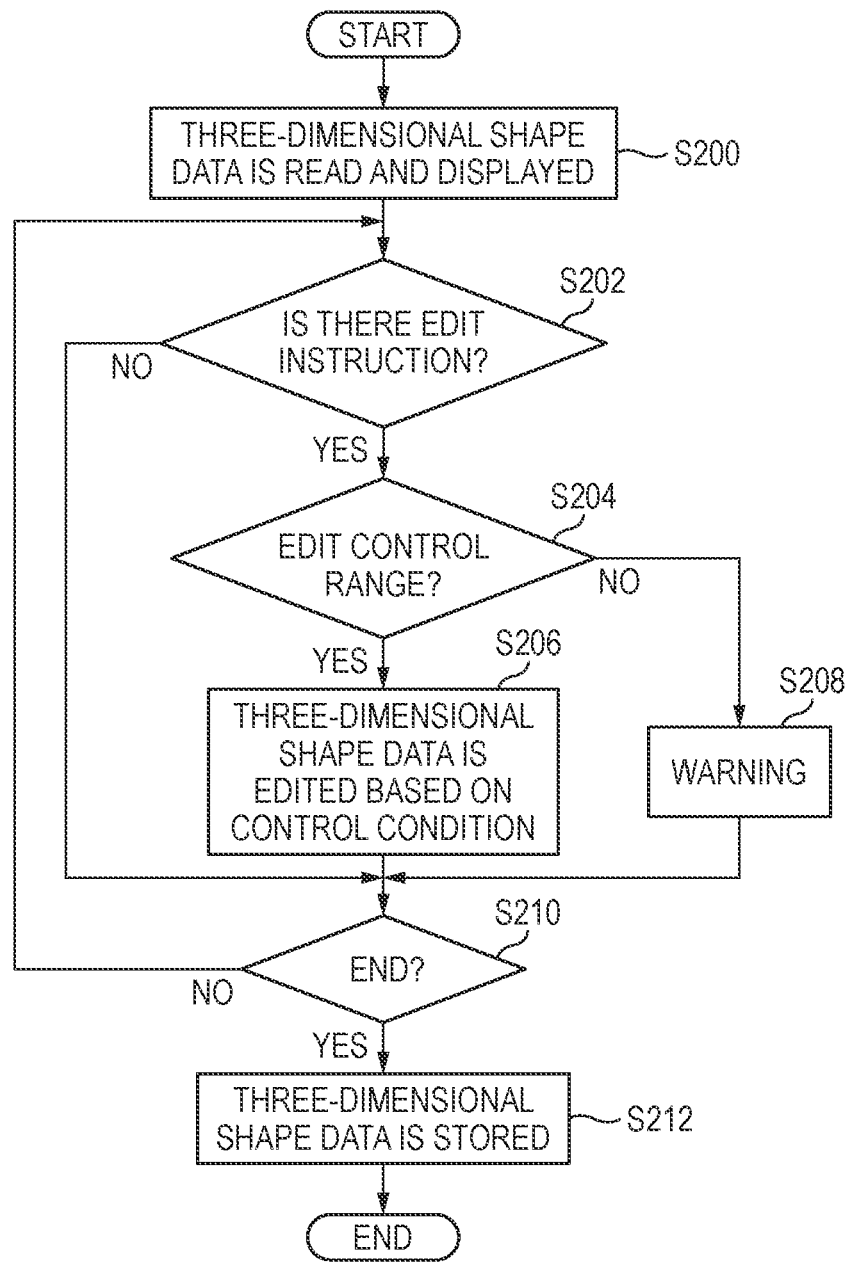
FIG. 3 is a flowchart of an editing program for editing an editable range of the three-dimensional shape represented by the three-dimensional shape data.

In the exemplary embodiment, a case where the processes of FIGS. 2 and 3 are separated programs is described. However, the embodiment is not limited thereto, and the processes of FIGS. 2 and 3 may be integrated into one program.

In the exemplary embodiment, a case where the editing program of the three-dimensional shape data is installed in the memory unit 20 in advance is described. However, the exemplary embodiment of the invention is not limited thereto. For example, the editing program may be stored and provided in a storage medium such as a compact disk read only memory (CD-ROM), or may be provided through a network.

In addition, the flow (see FIGS. 2 and 3) of processes of the editing program described in the exemplary embodiment is also an example, and it is needless to say that unnecessary steps may be deleted, new steps may be added, or processing order may be exchanged within the scope not departing from the gist of the exemplary embodiment.

The present invention is not limited to the above-described exemplary embodiment and various modifications are possible. In the scope of the spirit of the present invention, those skilled in the art may devise various changed examples and corrected examples and it is understood that the changed examples and the corrected examples belong to the scope of the present invention. In addition, for example, appropriate addition and removal of components, change of design, addition and omission of steps, or change of conditions performed by those skilled in the art on each exemplary embodiment is included in the scope of the present invention without departing from the gist of the present invention.

What is claimed is:

1. An editing apparatus of three-dimensional shape data, comprising:
a range setting unit that sets at least one of a protection target range and an editable range of a three-dimensional shape represented by three-dimensional shape data including three-dimensional position information, as an edit control range; and a control condition setting unit that sets a control condition for controlling edit in the editable range so as not to edit the protection target range when the editable range is edited.

2. The editing apparatus of three-dimensional shape data according to claim 1, wherein
the range setting unit sets the edit control range by using the three-dimensional position information.

3. The editing apparatus of three-dimensional shape data according to claim 2, wherein
the range setting unit sets the edit control range by using at least one piece of information of a point, a line, a plane, and a space represented by the three-dimensional position information.

4. The editing apparatus of three-dimensional shape data according to claim 3, wherein
the range setting unit sets the edit control range by using information held as other three-dimensional shape data different from the three-dimensional shape data of an edit target when setting the edit control range by using the three-dimensional position information represented by at least one piece of the information of the point, the line, the plane, and the space.

5. The editing apparatus of three-dimensional shape data according to claim 1, wherein
the range setting unit sets the edit control range by using attribute information given to the three-dimensional position information.

6. The editing apparatus of three-dimensional shape data according to claim 1, wherein
the range setting unit sets the edit control range by using at least one piece of the attribute information of color, intensity, material, and texture given to the three-dimensional position information.

7. The editing apparatus of three-dimensional shape data according to claim 1, wherein
the range setting unit sets the edit control range by using an attribute pattern set by using at least one piece of the attribute information of a period, a formula, and other three-dimensional shape data given to the three-dimensional position information.

8. The editing apparatus of three-dimensional shape data according to claim 1, wherein
the control condition setting unit sets the control condition by using at least one piece of information of a point, a line, a plane, and a space represented by the three-dimensional position information.

9. The editing apparatus of three-dimensional shape data according to claim 8, wherein
the three-dimensional shape data is voxel data representing the three-dimensional shape by a set of plural voxels, and the control condition setting unit sets the control condition by representing the point, the line, the plane, and the space by the voxel.

10. The editing apparatus of three-dimensional shape data according to claim 1, wherein
the control condition includes a condition for controlling at least one process of transformation, enlargement, reduction, movement, rotation, addition, deletion, replacement, and synthesis with respect to the editable range.

11. The editing apparatus of three-dimensional shape data according to claim 1, wherein
the control condition includes a condition for controlling at least one process of addition, deletion, change, replacement, and synthesis of an attribute with respect to the editable range.

12. The editing apparatus of three-dimensional shape data according to claim 1,
wherein the control condition includes a condition that a predetermined space outside the three-dimensional shape is set as the protection target range or the editable range.

13. An editing apparatus of three-dimensional shape data comprising:
an edit unit that edits the editable range according to the control condition of three-dimensional shape data edited by the editing apparatus of three-dimensional shape data according to claim 1.

14. The editing apparatus of three-dimensional shape data according to claim 13, wherein
the edit unit applies edit that is instructed only to the editable range, in a case where a range including the protection target range is edited, when the editable range is edited.

15. A non-transitory computer readable recording medium storing an editing program of three-dimensional shape data for causing a computer to function as each unit of the editing apparatus of three-dimensional shape data according to any one of claim 1.

* * * * *